(12) United States Patent
Meares et al.

(10) Patent No.: US 11,506,212 B2
(45) Date of Patent: Nov. 22, 2022

(54) BEARING CAGE RETAINER

(71) Applicant: Edwards Limited, Burgess Hill (GB)

(72) Inventors: Peter Meares, Burgess Hill (GB); Andrew William Snell, Burgess Hill (GB); Richard Glyn Horler, Burgess Hill (GB)

(73) Assignee: Edwards Limited, West Sussex (GB)

( * ) Notice: Subject to any disclaimer, the term of this patent is extended or adjusted under 35 U.S.C. 154(b) by 312 days.

(21) Appl. No.: 16/753,623

(22) PCT Filed: Oct. 5, 2018

(86) PCT No.: PCT/GB2018/052840
§ 371 (c)(1),
(2) Date: Apr. 3, 2020

(87) PCT Pub. No.: WO2019/069086
PCT Pub. Date: Apr. 11, 2019

(65) Prior Publication Data
US 2020/0248701 A1    Aug. 6, 2020

(30) Foreign Application Priority Data
Oct. 5, 2017    (GB) ...................................... 1716324

(51) Int. Cl.
*F16C 19/52*         (2006.01)
*F16C 33/38*         (2006.01)
(Continued)

(52) U.S. Cl.
CPC ............ *F04D 19/042* (2013.01); *F16C 19/06* (2013.01); *F04D 29/059* (2013.01); *F16C 19/52* (2013.01);
(Continued)

(58) Field of Classification Search
CPC ...... F16C 19/06; F16C 19/52; F16C 33/3806; F16C 33/41; F16C 33/412; F16C 33/414;
(Continued)

(56) References Cited

U.S. PATENT DOCUMENTS 8,123,412 B2 * 2/2012 Koci ..................... F16C 33/414
                                                                   384/523
8,186,937 B2 * 5/2012 Brewster ............. F04D 29/0563
                                                                   415/119
(Continued)

FOREIGN PATENT DOCUMENTS

CN            101189436 A       5/2008
CN            101595307 A     12/2009
(Continued)

OTHER PUBLICATIONS

Chinese Search Report dated Feb. 24, 2021 for corresponding Chinese application Serial No. 201880079065.6.
(Continued)

*Primary Examiner* — Phillip A Johnson
(74) *Attorney, Agent, or Firm* — Theodore M. Magee; Westman, Champlin & Koehler, P.A.

(57) ABSTRACT

The present invention provides bearing cage retainer for a rolling element rotor bearing in a vacuum pump. The bearing cage retainer being configured to have an operational arrangement in which, at the maximum longitudinal axial displacement limit of the outer race in the direction of the retainer, the bearing cage retainer is disengaged from the bearing cage, and a failure configuration characterised by the dislocation of the bearing cage by a longitudinal axial displacement of the bearing cage relative to the outer race in the direction of the retainer and in which the bearing cage
(Continued)

retainer engages said bearing cage and the bearing cage maintains the separation of the rolling elements within the bearing.

15 Claims, 3 Drawing Sheets

(51) Int. Cl.
*F04D 19/04* (2006.01)
*F16C 19/06* (2006.01)
*F04D 29/059* (2006.01)

(52) U.S. Cl.
CPC ...... *F16C 33/3806* (2013.01); *F16C 2360/45* (2013.01)

(58) Field of Classification Search
CPC .. F16C 33/416; F16C 2360/45; F04D 19/042; F04D 29/049; F04D 29/059
See application file for complete search history.

(56) References Cited

U.S. PATENT DOCUMENTS

| | | | |
|---|---|---|---|
| 9,759,256 B2* | 9/2017 | Brewster | F04D 29/059 |
| 2008/0112660 A1* | 5/2008 | Koch | F16C 33/664 |
| | | | 384/397 |

FOREIGN PATENT DOCUMENTS

| | | |
|---|---|---|
| CN | 204476836 U | 7/2015 |
| CN | 107208654 A | 9/2017 |
| EP | 1972794 A2 | 9/2008 |
| EP | 2557315 A2 | 2/2013 |
| JP | S6392819 A | 6/1988 |
| JP | H064390 U | 1/1994 |
| JP | 2008542628 A | 11/2008 |
| JP | 2014173431 A | 9/2014 |
| WO | 2008044332 A1 | 4/2008 |

OTHER PUBLICATIONS

British Examination Report dated Feb. 21, 2018 and Search Report dated Feb. 20, 2018 for corresponding British Application No. GB1716324.7.

PCT Notification of Transmittal of the International Search Report and the Written Opinion of the International Searching Authority, or the Declaration dated Nov. 12, 2018, PCT Search Report and Written Opinion dated Nov. 12, 2018 for corresponding PCT Application No. PCT/GB2018/052840.

Japanese Office Action dated Jul. 21, 22 for corresponding Japanese application Serial No. 2020-519372, 8 pages.

* cited by examiner

BEARING CAGE RETAINER

CROSS-REFERENCE OF RELATED APPLICATION

This application is a Section 371 National Stage Application of International Application No. PCT/GB2018/052840, filed Oct. 5, 2018, and published as WO 2019/069086 A1 on Apr. 11, 2019, the content of which is hereby incorporated by reference in its entirety and which claims priority of British Application No. 1716324.7, filed Oct. 5, 2017.

FIELD

The present invention relates to a bearing cage retainer and, in particular, a bearing cage retainer for a rolling element rotor hearing in a vacuum pump, particularly a turbomolecular pump. The invention further relates to a turbomolecular pump comprising such a retainer, bearing system for a turbomolecular pump, and methods for assembling turbomolecular pumps.

BACKGROUND

Vacuum pumps typically comprise an impeller in the form of a rotor mounted on a shaft for rotation relative to a surrounding stator. The shaft may be supported by a bearing arrangement comprising two bearings located at or intermediate respective ends of the shaft. Alternatively, the shaft may be cantilever supported with two bearings located at or immediate to one end of the shaft. In both arrangements, one or both of these hearings may be in the form of rolling element bearings. For instance, the upper hearing may be a magnetic bearing, and the lower bearing a rolling element bearing.

Referring to FIG. 1, a typical rolling bearing (1) comprises an inner race (2) fixed relative to the shaft (3) of the vacuum pump (4), an outer race (5), and a plurality of rolling elements (6), supported by a cage (7), for allowing relative rotation of the inner race (2) and the outer race (5). Typically, the outer race (5) is fixedly attached to a hearing support damper (8), which is in turn is fixedly attached to the housing (9) of the vacuum pump. The bearing support damper (8) is typically held in place by a bearing support nut (10).

The rolling element bearing (1) is lubricated to establish a load-carrying film separating the bearing components in rolling and sliding contact in order to minimize friction and wear.

In normal use, the various parts of the bearing (1) will remain in the substantially the same plane with the inner race (2), rolling elements (6) and cage (7) rotating about the axis (A) of the shaft (3). However, it is possible for turbomolecular pumps to fail as a consequence of contamination in the mechanical bearing causing the hearing cage to become axially displaced and ejected during operation.

If the bearing cage is ejected whilst the pump is running the pump may fail in one of three modes.

In a first failure mode, the bearing may become noisy. Typically, during such a failure mode the user will turn the pump off and then investigate the reason for the failure. This failure mode is considered benign. The pump can be repaired In a second failure mode, the pump will continue to run, but once stopped will not restart. Upon the failed restart the user will typically investigate the reason for the failure. Again, this failure mode is considered benign. The pump can be repaired.

In a third failure mode, the bearing fails and consequently a rotor impacts a stator leading to the breakup of the blades. Such a failure mode is potentially hazardous and costly. Typically, the pump cannot be repaired, and the remainder of the user's instruments may be contaminated.

The present invention addresses these and other problems with the prior art.

The discussion above is merely provided for general background information and is not intended to be used as an aid in determining the scope of the claimed subject matter. The claimed subject matter is not limited to implementations that solve any or all disadvantages noted in the background.

SUMMARY

Accordingly, in a first aspect, the present invention provides a bearing cage retainer for a rolling element rotor bearing in a vacuum pump, typically a turbomolecular pump.

The bearing may comprise an outer race, an inner race, and a plurality of separated rolling elements located within a rotatable bearing cage. Typically, the rolling elements are halls. Preferably, the bearing comprises from about 6 to about 12 halls, 7 being an example. Typically, the bearing cage is castellated. Typically, the rolling elements are substantially uniformly separated. Preferably, the bearing cage has a ring-shaped (annular) cross-section and the rolling elements are held within the ring with equidistant separation between adjacent rolling elements.

Typically, a vacuum pump is configured to limit the longitudinal axial displacement of the hearing, in particular the outer race of the bearing. By longitudinal axial displacement it is meant displacement in a direction parallel to the rotational axis of the bearing. The longitudinal axial displacement may be limited by a removable fixture coupled to the outer race, such as a retaining nut or a bearing damper retaining nut. The retaining nut and bearing cage retainer may be a single unitary structure.

The bearing cage retainer may be configured to have an operational arrangement in which the retainer does not engage the bearing cage. Preferably, the bearing cage retainer is configured to have an operational arrangement in which, at the maximum longitudinal axial displacement limit of the outer race in the direction of the retainer, the bearing cage retainer is disengaged from the bearing cage. Thus, during normal use of the vacuum the bearing cage retainer may not engage the bearing cage.

The bearing cage retainer may be further configured to have a failure configuration in which the retainer is engaged with said bearing cage. Preferably, a failure configuration characterised by the dislocation of the bearing cage by a longitudinal axial displacement of the bearing cage relative to the outer race in the direction of the retainer and in which the bearing cage retainer is engaged by said hearing cage.

Typically, in the failure configuration the bearing cage retainer enables the bearing cage to maintain the separation of the rolling elements. Preferably, the hearing cage may remain rotatable in the failure configuration, preferably wherein the rotational axis of the bearing cage is substantially coaxial with a rotational axis of the inner race and/or a rotor shaft of the vacuum pump. Preferably the hearing cage and/or rolling elements remain(s) at least partially within the bearing (i.e. between the inner race and outer race) when in the failure configuration. If the turbomolecular pump is in use, the hearing cage may be rotating in an operational arrangement and remain rotating in the failure configuration.

In normal operating conditions the bearing cage remains in a substantially axially fixed position relative to the outer race whilst rotating relative thereto. Typically, the failure configuration is characterised by an unwanted axial displacement (or dislocation) of the bearing cage relative to the outer race, typically a downward axial displacement. The axial displacement is relative to the position of the outer race in its normal operating configuration. The bearing cage may also be axially displaced relative to the inner race when in the failure configuration.

In an embodiment, the failure configuration provides an audible signal that the bearing is failing when the turbomolecular pump is in use. Typically, the user will hear the audible signal and stop the turbomolecular pump. Additionally, or alternatively, there may be a change in pump vibration, for instance a change in amplitude or frequency, typically an increase in amplitude. Again, the user may detect the change in vibration and stop the pump. Vibration detection may be by user inspection or by automated means, such as the use of accelerometers (e.g. piezo-electric transducers). The level of vibration may be compared with historical baseline values.

Additionally, or alternatively, in an aspect the invention provides a bearing cage retainer for a vacuum pump comprising rolling element rotor bearing, the bearing comprising an outer race, an inner race, and a plurality of rolling elements located within a bearing cage, wherein the bearing cage retainer is configured to selectively engage the bearing cage only when in a failure configuration, said failure configuration being characterised by an audible signal that the bearing is failing and the bearing cage remaining rotatable. Preferably, the retainer is configured so that the bearing cage remains at least partially within the bearing when in the failure configuration. If the turbomolecular pump is in use, the bearing cage may be rotating and remain rotating in the failure configuration.

Again, the failure configuration may be characterised by an axial displacement of the bearing cage relative to the outer race. Typically, the vacuum pump is a turbomolecular pump.

Additionally, or alternatively, in an aspect the invention provides a bearing cage retainer for a vacuum pump comprising rolling element rotor bearing, the bearing comprising an outer race, an inner race, and a plurality of rolling elements located within a rotatable bearing cage, wherein the bearing cage retainer is configured to engage the hearing cage only when in a failure configuration, said failure configuration being characterised by an axial displacement of the bearing cage relative to the outer race and separation of the rolling elements being maintained, preferably a substantially uniform separation of the rolling elements is maintained (i.e. adjacent rolling elements are all equidistantly separated).

Preferably the bearing cage remains rotatable. Preferably, bearing cage remains at least partially within the bearing when in the failure configuration. If the turbomolecular pump is in use, the hearing cage may be rotating and remain rotating.

Again, the failure configuration may be characterised by an axial displacement of the bearing cage relative to the outer race.

In all aspects and embodiments, the retainer may be configured such that when the hearing cage retainer is in a failure configuration circumferential separation of the rolling elements is maintained. Preferably, the rolling elements remain substantially circumferentially equidistantly separated. Preferably the rolling elements remain at least partially retained within the bearing cage in the failure configuration. Preferably at least half of each rolling element remains within the bearing cage. Preferably the rolling elements remain engaged with the inner race and outer race. Preferably the rolling elements may roll in the failure configuration.

Preferably, the rolling elements are balls and in the failure configuration at least a hemisphere of each of the balls remains located between the inner and outer race of the bearing.

Thus, in a turbomolecular pump comprising a bearing cage retainer according to the invention, should the bearing cage become axially displaced, for instance due to contamination in the bearing, the bearing cage may engage the bearing cage retainer and be maintained in a position in which the rolling elements remain within the bearing cage and substantially equally separated. Whilst the bearing will have failed, the turbomolecular pump may be shut down safely, avoiding a catastrophic failure of the pump.

The bearing cage retainer according to any aspect of the invention may comprise at least one hearing cage braking surface for frictional sliding engagement with the bearing cage in the failure configuration. Although not limited to any specific shape, typically, the at least one braking surface is substantially annular or part-annular (i.e. a part of an annulas). Two, three, four or five part-annular surfaces are preferred.

Typically, the ratio of the breadth of the braking surface in a radial direction to the breadth of the bearing cage in a radial direction is from about 1:1 to about 1:2, preferably from about 4:5 to about 2:3.

Additionally, or alternatively, the bearing cage may be configured such that, in the failure configuration, the at least one braking surface engages only the bearing cage. Preferably, the braking surface does not engage the outer race and/or the inner race when in the failure configuration.

Typically, in the operational arrangement the at least one braking surface lies in a plane that intersects the outer race and/or inner race of the hearing, preferably the plane is substantially tangential to a rotational axis of the bearing and/or the rotational axis of the impeller.

Typically, the braking surface is located on a bearing cage-side surface of an annular or part-annular boss forming part of the bearing cage retainer.

The bearing cage retainer may be configured to engage and retain the bearing cage when the turbomolecular pump is running at full speed. Typically, at full speed the impeller shaft and inner race will rotate at greater than 50 000 RPM, typically at least 60 000 RPM. A bearing cage will typically rotate at approximately ⅓ the speed of the inner race, for instance 16 000 RPM or greater, or 20 000 RPM or greater, when the turbomolecular pump is running at full speed.

Typically, in the operational arrangement (i.e. in normal working conditions) the bearing cage retainer does not engage the bearing cage. Additionally, or alternatively, the bearing cage retainer does not engage the bearing at all in an operational arrangement.

Typically, the outer race is rotationally fixed whereas the inner race, bearing cage and rolling elements are rotatable substantially about an axis (i.e. they are substantially coaxial), typically they are coaxial with axis of the rotor shaft of the turbomolecular pump. Typically, the rolling elements rotate about their own axis and about the axis of the rotor shaft. Typically, the inner race is coupled to a rotor shaft of the turbomolecular pump. In use, the hearing cage retainer may be rotatable relative to the outer race or fixed relative thereto.

The hearing cage retainer may be manufactured from any suitable material, for instance an alloy, a polymer, a ceramic, or a composite. Typically, the material and/or geometry for the retainer will be selected to be sufficiently stiff so as to substantially limit axial deflection thereof when the retainer is engaged if a bearing failure occurs. The material properties may be selected so that they are appropriate for the operating temperature of the bearing, e.g. between about 90° C. and about 150° C.

Additionally, or alternatively, the material may be selected so that it can be machined to the required tolerances, is thermally stable at operating and storage temperatures, and is stable when exposed to any lubricant present.

Polymers suitable for use in the bearing cage retainers of the invention may be selected from group consisting of elastomers, thermoplastic materials or thermosets. Thermoplastic materials are preferred. Typically, the polymer is selected from the group consisting of polyolefins, such as polyethylene and polypropylene; polyvinylchloride, polyethylene terephthalate; and fluoropolymers, such as polytetrafluoroethylene, and derivatives and copolymers thereof. High performance thermoplastic materials may also be employed. Preferred high performance thermoplastics may be selected from the group consisting of liquid crystal polymers, including aromatic polyamides and aromatic polyesters, aromatic polyimides, polyamides, polysulpones, polyethylenimines, and polyether ether ketone (PEEK), or derivatives or copolymers thereof.

The polymers may additionally include one or more from the group consisting antistatics, antioxidants, mould release agents, flameproofing agents, lubricants, colorants, flow enhancers, fillers, including nanofillers, light stabilizers and ultraviolet light absorbers, pigments, anti-weathering agents and plasticisers.

Suitable alloys include stainless steel, and alloys of aluminium and titanium.

In an embodiment, the bearing cage retainer may be self-lubricating or have a low friction surface to reduce wear. However, this is not essential in all embodiments as the portion of the pump in which the bearing and bearing cage retainer are located will typically be oiled.

In embodiments the bearing cage retainer is metallic (e.g. stainless steel) with a polymeric or inorganic (e.g. ceramic) coating, in particular to form the braking surface. Particularly preferred coatings for forming the braking surface may be selected from the group consisting of PEEK, polyamides (e.g. nylon), polyoxymethylene, PTFE and molybdenum disulphide.

Additionally, or alternatively, the bearing cage retainer may comprise a thrust bearing, typically a thrust ball bearing or a thrust roller hearing. Typically, the thrust bearing will comprise an annular race which engages the bearing cage when in when in a failure configuration.

The bearing cage retainer may be located on the outer race or inner race, or as part of a hearing damper, hearing retaining nut, between a felt pot and pump body, as part of a lubrication cartridge, as part of the lubrication stack, or as part of an oil delivery nut. Preferably, the bearing cage retainer can be retrofitted to a turbomolecular pump during servicing thereof.

Typically, the bearing cage retainer does not form part of the bearing, i.e. the bearing cage retainer is not integrally formed with the hearing itself. However, in embodiments, the retainer may form part of the inner race and/or outer race.

Such an arrangement is advantageous because it may reduce the number of parts in the tolerance stack, and may allow the retainer to move with the damper when in use, allowing clearances between the cage and the retainer to be smaller.

The invention further provides a hearing damper, bearing retaining nut, lubrication cartridge and/or oil delivery nut comprising a bearing cage retainer according to the invention.

The invention further provides, a turbomolecular pump comprising a bearing cage retainer according to any other aspect or embodiment of the invention. The turbomolecular pump may comprise at least one rotor and at least one stator, each comprising a plurality of rotor blades or stator blades. Preferably, when the retainer is in a failure state/configuration the rotor(s) and stator(s), or blades thereof, do not contact one another.

The invention may thus provide a turbomolecular pump comprising a hearing cage retainer and the turbomolecular pump further comprising a rolling element rotor bearing comprising an outer race, an inner race, and a plurality of rolling elements located within a rotatable bearing cage; a rotatable rotor shaft coupled to at least one substantially annular rotor array; and at least one substantially annular stator array adjacent the rotor array and operably separate therefrom; wherein the rotatable rotor shaft is coupled to the inner race of hearing, and wherein when the bearing cage retainer is in a failure configuration the rotor array and stator array remain separated.

Additionally, or alternatively, the invention further provides a turbomolecular pump comprising a rolling element rotor bearing comprising an outer race, an inner race and a plurality of rolling elements located within a bearing cage, the turbomolecular pump further comprising a hearing cage retainer which is configured to engage the hearing cage when the hearing cage has become axially displaced relative to the outer race by a predetermined distance in the direction of the hearing cage retainer. Typically, the predetermined distance is no more than half the depth of the rolling element, e.g. the half a ball depth. Predetermined distances of from about 50 µm to about 3 mm may be used, 0.5 mm being one example.

Typically, the turbomolecular pump comprises at least one rotor and at least one stator. Preferably, the rotor(s) and stator(s), or blades thereof, do not contact when the retainer and hearing cage are engaged.

The invention further provides rolling element rotor hearing system for a turbomolecular pump. The bearing system may comprise a rolling element rotor bearing comprising an outer race, an inner race, and a plurality of rolling elements located within a rotatable hearing cage; an axial backstop configured to limit longitudinal axial displacement of the outer race of the hearing; and a hearing cage retainer located below the bearing cage and configured such that at the maximum longitudinal axial displacement limit of the outer race in the direction of the retainer the bearing cage retainer is disengaged from the bearing cage.

The system is arranged such that in a failure configuration the bearing cage retainer engages the bearing cage and limits the axial displacement of the hearing cage relative to the outer race to an extent such that the bearing cage maintains the separation of the rolling elements. Said failure configuration is characterised by a dislocation of the hearing cage by the longitudinal axial displacement of the bearing cage relative to the outer race in the direction of the retainer. Preferably, the rolling elements each remain in rolling, sliding engagement with both inner race and outer race of the bearing. Additionally, or alternatively, the retainer limits the axial displacement of the bearing cage relative to the outer race to an extent such that the bearing cage and, preferably the inner race, remains rotatable, preferably wherein the rotational axis of the bearing cage remains substantially coaxial with a rotational axis of the inner race and/or a rotor shaft of the vacuum pump.

The invention further provides a method of manufacturing a turbomolecular pump comprising installing a bearing cage retainer as disclosed elsewhere in the application.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Preferred features of the present invention will now be described, by way of example, with reference to the accompanying drawings, in which.

DETAILED DESCRIPTION

The invention provides a bearing cage retailer for a rolling element rotor bearing in a turbomolecular pump.

Figure 1:
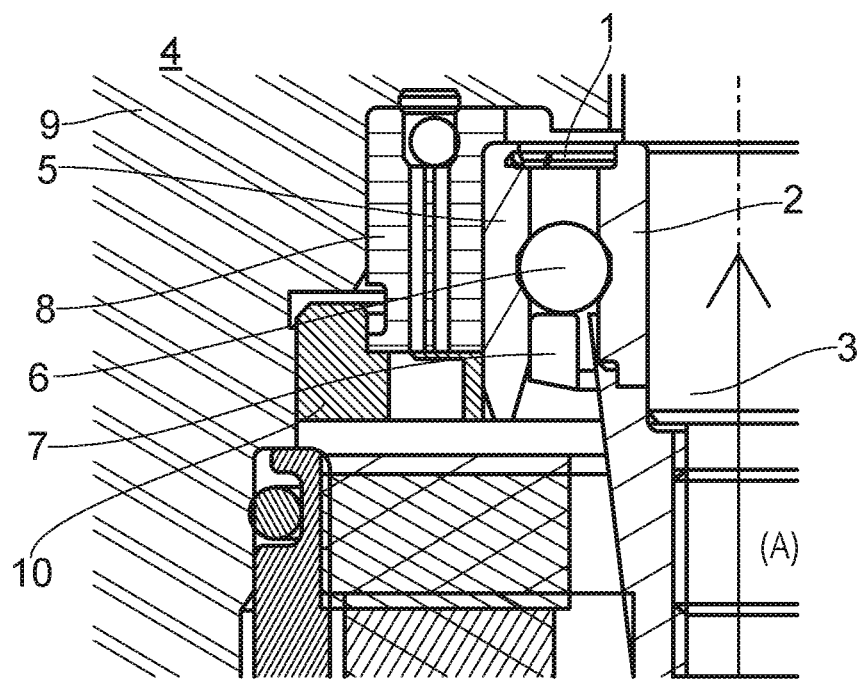
FIG. 1 shows a prior art bearing in situ in a turbomolecular pump.
Figure 2:
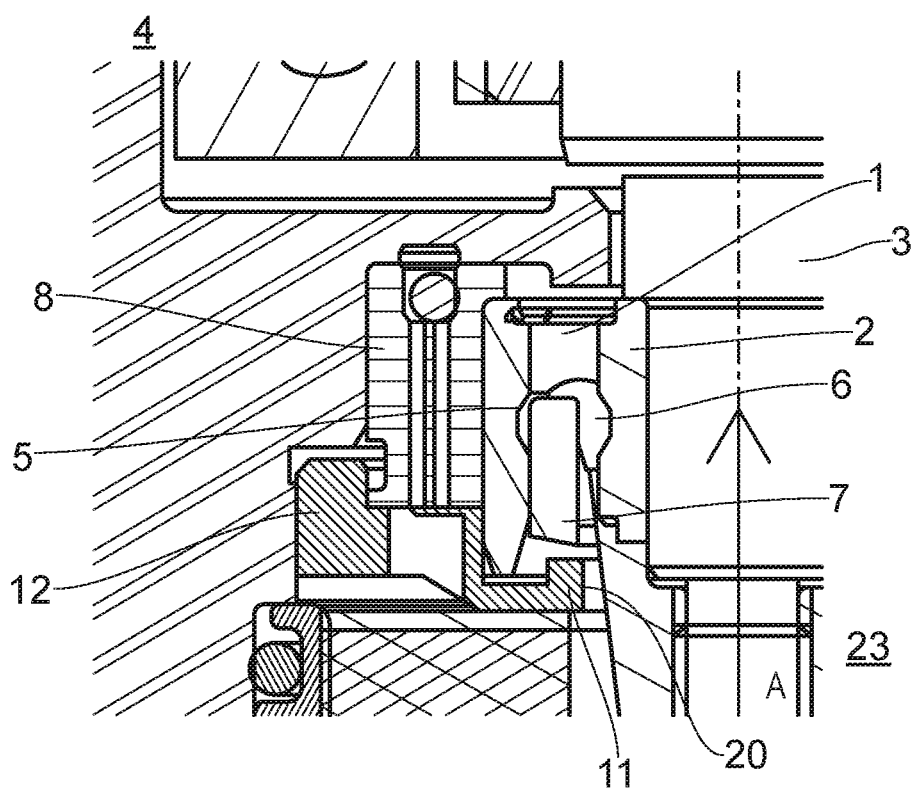
FIG. 2 shows a hearing cage retainer according to the invention.
Figure 6:
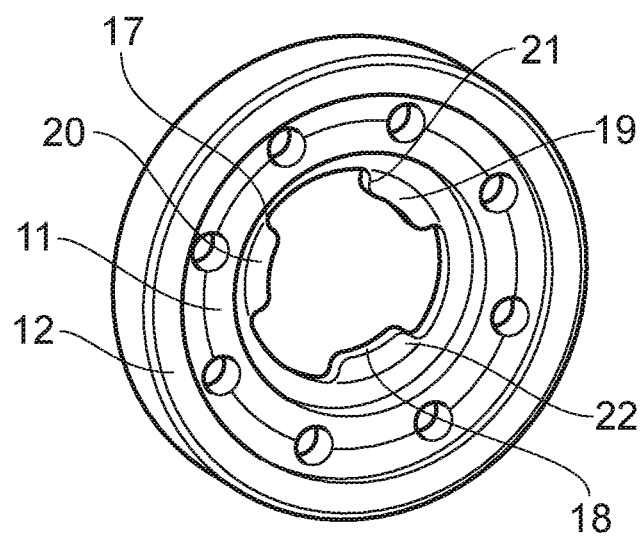
FIG. 6 shows a bearing cage retainer according to the invention.

As illustrated in FIGS. 2 and 6, in an example, the bearing cage retainer (11) is integrally formed with a bearing retaining nut (12). Advantageously, this allows the bearing cage retainer (11) to be introduced during servicing of the turbomolecular pump (4) by simply replacing the previous bearing retaining nut (10) with a bearing retaining nut (12) comprising a bearing cage retainer (11) according to the invention. The nut (12) is typically vented and/or castellated in order to allow oil to drain from the bearing.

The illustrated bearing cage retainer (11) is employed to engage the bearing cage (7) in a failure configuration. As better illustrated in FIG. 6, the bearing cage retainer comprises three pads (17, 18, 19) which each comprise a braking surface (20, 21, 22). In the failure configuration it is the braking surface (20, 21, 22) that engages the bearing cage. The illustrated bearing retaining nut is a single metallic unitary structure; however, the breaking surface may be in form of a coating, e.g. a polymeric or ceramic coating. As shown FIG. 2, in the illustrated operational arrangement the breaking surface (20) lies in a plane that intersects both inner race (2) and outer race (5), and which is substantially tangential to the axis (A) of the impeller shaft.

The rolling element rotor bearing illustrated in FIG. 2 is a ball bearing. The bearing comprises an inner race (2) which is fixedly attached to the impeller shaft (3) of the vacuum pump. In use, the impeller shaft (3) rotates about an axis (A) wherein the arrow indicates an upwards direction during normal use. The axis of rotation of the inner race (2) and bearing cage are substantially coaxial with the axis (A).

The illustrated hearing comprises a series of balls (6), typically from about 6 to 1:2, which are located within a bearing cage (7). In normal use, the bearing cage (7) maintains the circumferentially uniform separation of the balls (6). Typically, maintaining the substantially uniform separation of the halls maintains the substantially coaxial alignment of the bearing cage and inner race with the axis A. The bearing cage (7) may for instance be a snap-fit Torlon® castellated ring. The illustrated ball beating (1) and bearing retaining nut (12) with an integrally formed bearing cage retainer (11) form a rolling element rotor bearing system (23) for a turbomolecular pump.

In FIG. 2, the outer race (5) is fixedly attached to the hearing support damper (8). Typically, the outer race (5) is attached to the support damper (8) using adhesive.

In FIG. 2, the hearing cage retainer (11) is separated from the bearing cage by a sufficient axial distance that the bearing cage retainer (11) will not engage the bearing cage (7) unless the bearing cage (7) has become downwardly axially displaced relative to the outer race (5) (i.e. dislocated). FIG. 2 shows an operational arrangement for the bearing cage retainer (11).

In use, the bearing retaining nut (10, 12) provides an axial backstop to the bearing support damper (8). Typically, the bearing retaining nut (10, 12) prevents downward axial displacements of the bearing of greater than 150 µm. Accordingly, the hearing cage retainer (11) may be arranged such that it is separated from the bearing cage (7) at its most downward operating position by 50 µm or more in an axial direction. Typically, the separation is from about 50 µm to about 3 mm, 0.5 mm being one example. Preferably, the separation is no more than half the depth of the rolling element, e.g. the half a ball depth.

In a failure configuration, the hearing cage (7) may become downwardly axially displaced relative to the outer race (5) and contact the bearing cage retainer (11). This may happen because of contamination in the bearing (1) causing the bearing cage (7) to be ejected from the bearing (1). In such a failure configuration, the bearing cage retainer (11) may prevent the complete ejection of the bearing cage (7) from the bearing (1) and maintain circumferential separation of the bearing balls (6), preferably circumferentially uniform separation thereof. By maintaining the separation of the bearing balls (6), the axial alignment of the impeller shaft may be maintained, preventing the pump's rotors from contacting its stators and, thereby, avoiding a catastrophic failure. If the vacuum pump (4) is running at the time a failure configuration is attained an audible noise or change in vibration will alert the user, enabling the pump (4) to be stopped in a controlled manner. The bearing cage retainer (11) thereby enables the hearing (1) to fail safely. The bearing (1) will have failed and will need to be replaced, typically along with the bearing cage retainer (11)q however, the vacuum pump (4) and user's instruments (not shown) may be largely unaffected by the failure.

Figure 3:
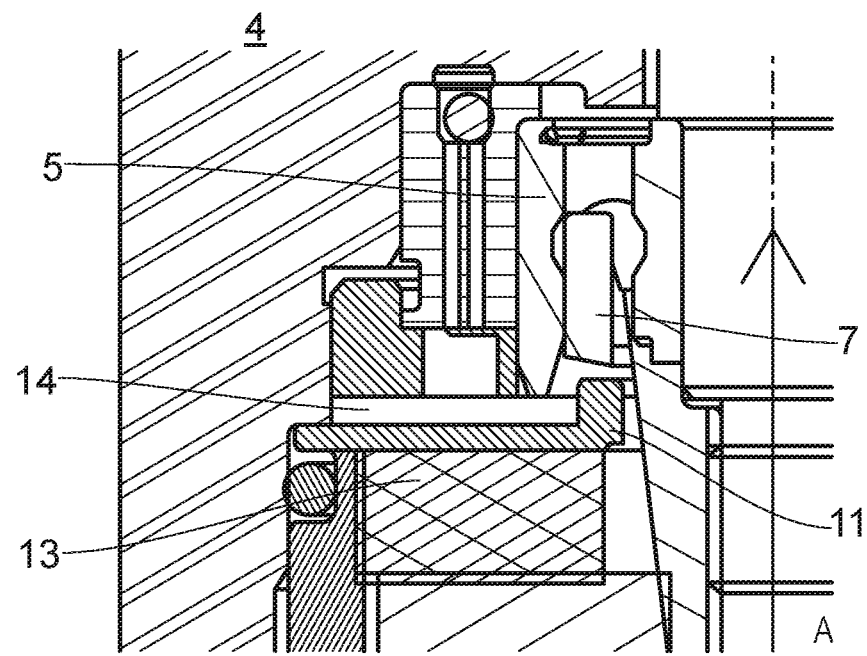
FIG. 3 shows a bearing cage retainer according to the invention.

FIG. 3 illustrates an alternative embodiment of the invention. In this embodiment, a separate bearing cage retainer (11) is located between felt pot (13) and the pump body (14). As with the other embodiments of the invention, in the illustrated operational arrangement, the bearing cage retainer (11) is axially separated from the bearing cage (7) by a sufficient distance that the hearing cage retainer (11) will not engage the bearing cage (7) unless the bearing cage (7) has become downwardly axially displaced relative to the outer race (5), e.g. in a failure configuration.

The bearing cage retainer (11) is again preferably vented and/or castellated to enable lubricant to flow around the bearing.

Advantageously, this bearing cage retainer (11) can be inserted when the felt pot (14) is replaced during a routine service of the vacuum pump (4).

Figure 4:
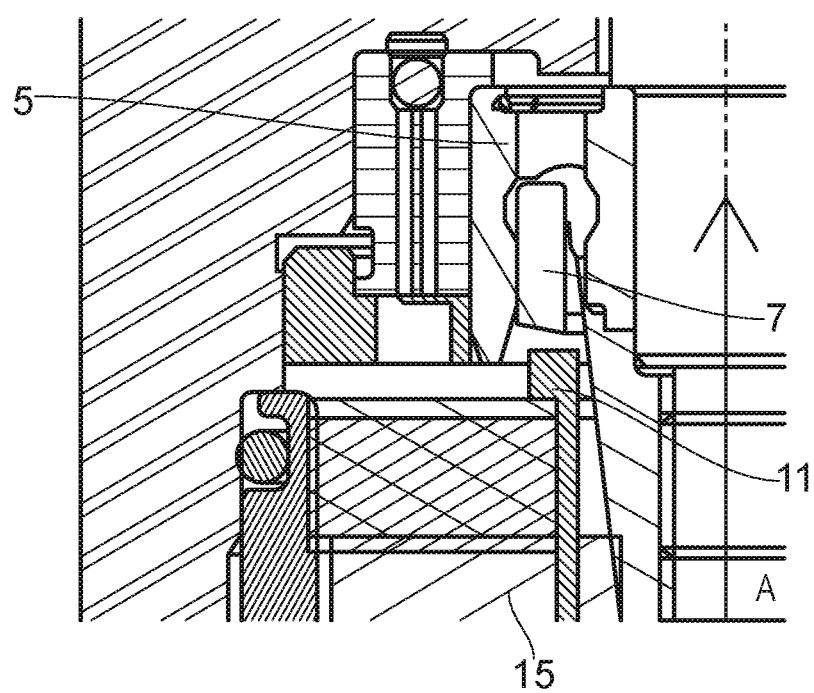
FIG. 4 shows a bearing cage retainer according to the invention.

FIG. 4 illustrates a still further example of the invention in which a bearing cage retainer (11) forms part of the lubrication cartridge (15). As with the other embodiments of the invention, the illustrated bearing cage retainer (11) is axially separated from the bearing cage (7) by a sufficient distance that the bearing cage retainer (11) will not engage the bearing cage unless the hearing cage (7) has become downwardly axially displaced relative to the outer race (5).

Again, advantageously, this bearing cage retainer (11) can be installed when the lubrication cartridge (15) is replaced during a service.

Figure 5:
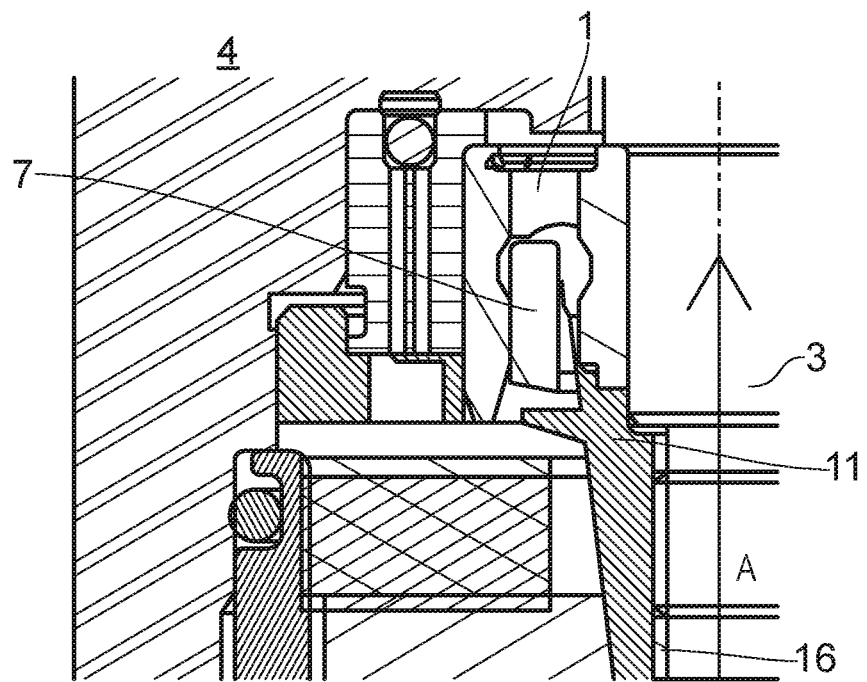
FIG. 5 shows a hearing cage retainer according to the invention.

FIG. 5 illustrates a still further example of the invention n which the bearing cage retainer (11) is integrally formed with an oil delivery nut (16). The illustrated bearing cage retainer further functions as an oil thrower, which may be advantageous.

The bearing cage retainer (11) is coupled to the impeller shaft (3). Accordingly, this bearing cage retainer (11) rotates about the impeller's axis (A) when the pump is in use, albeit at a different speed to the bearing cage (7). A moving bearing cage retainer (11) may help minimise wear on the cage (7) as it is ejected. The skilled person will be able to select whether a static or rotating retainer (11) is most advantageous for a specific bearing (1) and/or vacuum pump (4).

It will be appreciated that various modifications may be made to the embodiments shown without departing from the spirit and scope of the invention as defined by the accompanying claims as interpreted under patent law.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A bearing cage retainer for a rolling element rotor bearing in a vacuum pump; the bearing comprising an outer race, an inner race, and a plurality of separated rolling elements retained within a rotatable bearing cage; the vacuum pump being configured to limit longitudinal axial displacement of the outer race of the bearing; and the bearing cage retainer being configured to have an operational arrangement in which, at the maximum longitudinal axial displacement limit of the outer race in the direction of the retainer, the bearing cage retainer is disengaged from the bearing cage, and a failure configuration characterized by the dislocation of the bearing cage by a longitudinal axial displacement of the bearing cage relative to the outer race in the direction of the retainer and in which the bearing cage retainer engages said bearing cage and the bearing cage maintains the separation of the rolling elements within the bearing.

2. The bearing cage retainer according to claim 1 wherein in the failure configuration the bearing cage retainer supports the bearing cage such that each of the rolling elements are in rolling and/or sliding engagement with both the outer race and inner race of the bearing.

3. The bearing cage retainer according to claim 1 wherein the bearing cage retainer is configured such that when the bearing cage retainer is in the failure configuration the bearing cage is rotatable.

4. The bearing cage retainer according to claim 1 wherein, when the bearing is rotating, at the transition from the operational arrangement to the failure configuration the bearing cage retainer provides an audible signal and/or detectable change in vibration indicating that the bearing is failing.

5. The bearing cage retainer according to claim 1 comprising at least one bearing cage braking surface for frictional sliding engagement with the bearing cage in the failure configuration.

6. The bearing cage retainer according to claim 5 wherein the at least one braking surface is substantially annular or part annular.

7. The bearing cage retainer according to claim 5 wherein the ratio of the breadth of the braking surface in a radial direction to the breadth of the bearing cage in a radial direction is from 1:1 to 1:2.

8. The bearing cage according to claim 5 wherein in the failure configuration the at least one braking surface engages only the bearing cage.

9. The bearing cage according to claim 5 wherein in the operational arrangement the at least one braking surface lies in a plane that intersects the outer race and/or inner race of the bearing.

10. The bearing cage retainer according to claim 5 comprising a part-annular boss, wherein the at least one braking surface is the bearing cage-side surface of the boss.

11. The bearing cage retainer according to claim 1 comprising a thrust race bearing configured to engage the bearing cage when in the failure configuration.

12. The bearing cage retainer according to claim 1 wherein the rolling elements are balls and in the failure configuration at least a hemisphere of each of the balls remains located between the inner and outer race.

13. A turbomolecular pump comprising:
a rolling element rotor bearing comprising an outer race, an inner race, and a plurality of rolling elements located within a rotatable bearing cage;
a bearing cage retainer for the rolling element rotor bearing; the turbomolecular pump being configured to limit longitudinal axial displacement of the outer race of the bearing; and the bearing cage retainer being configured to have an operational arrangement in which, at the maximum longitudinal axial displacement limit of the outer race in the direction of the retainer, the bearing cage retainer is disengaged from the bearing cage, and a failure configuration characterized by the dislocation of the bearing cage by a longitudinal axial displacement of the bearing cage relative to the outer race in the direction of the retainer and in which the bearing cage retainer engages said bearing cage and the bearing cage maintains the separation of the rolling elements within the bearing;
a rotatable rotor shaft coupled to at least one substantially annular rotor array; and
at least one substantially annular stator array adjacent the rotor array and operably separate therefrom; wherein the rotatable rotor shaft is coupled to the inner race of the bearing, and wherein when the bearing cage retainer is in the failure configuration the rotor array and stator array remain separated.

14. A bearing retaining nut for a bearing damper of a turbomolecular pump, said bearing nut comprising a bearing cage retainer for a rolling element rotor bearing in a vacuum pump; the bearing comprising an outer race, an inner race, and a plurality of separated rolling elements retained within a rotatable bearing cage; the vacuum pump being configured to limit longitudinal axial displacement of the outer race of the bearing; and the bearing cage retainer being configured to have an operational arrangement in which, at the maximum longitudinal axial displacement limit of the outer race in the direction of the retainer, the bearing cage retainer is disengaged from the bearing cage, and a failure configuration characterized by the dislocation of the bearing cage by a longitudinal axial displacement of the bearing cage relative to the outer race in the direction of the retainer and in which the bearing cage retainer engages said bearing cage and the bearing cage maintains the separation of the rolling elements within the bearing.

15. A rolling element rotor bearing system for a turbomolecular pump, said bearing system comprising:

a rolling element rotor bearing comprising an outer race, an inner race, and a plurality of separated rolling elements retained within a rotatable bearing cage;

an axial backstop configured to limit longitudinal axial displacement of the outer race of the bearing; and a bearing cage retainer located below the bearing cage and configured such that at the maximum longitudinal axial displacement limit of the outer race in the direction of the retainer the bearing cage retainer is disengaged from the bearing cage; and wherein in a failure configuration characterized by a dislocation of the bearing cage by the longitudinal axial displacement of the bearing cage relative to the outer race in the direction of the retainer, the bearing cage retainer engages the bearing cage and limits the axial displacement of the bearing cage relative to the outer race to an extent such that the bearing cage maintains the separation of the rolling elements within the bearing.

* * * * *